Jan. 27, 1948.  C. J. SCRANTON  2,435,020
THRESHER WITH ADJUSTABLE SPEED CYLINDER DRIVE
Filed May 8, 1941  2 Sheets-Sheet 1
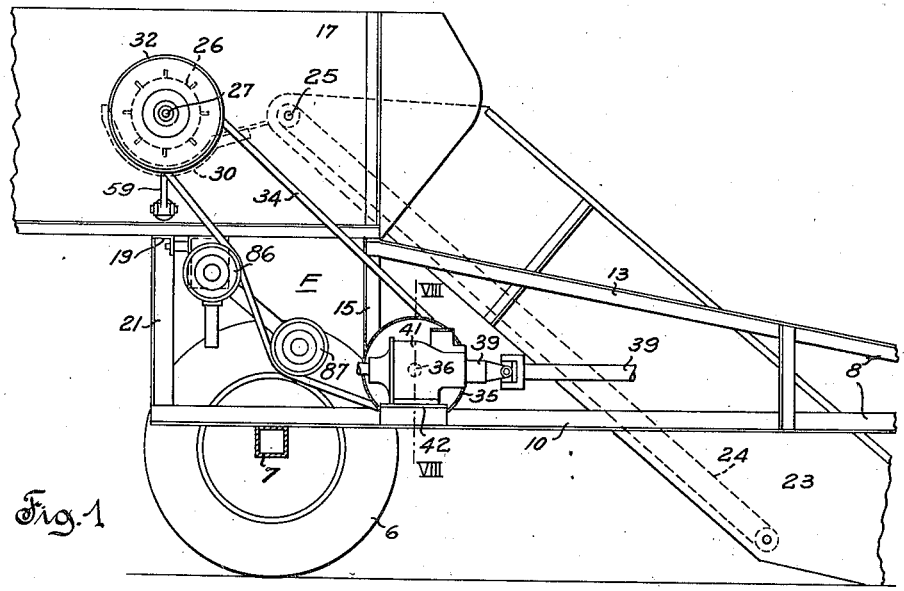
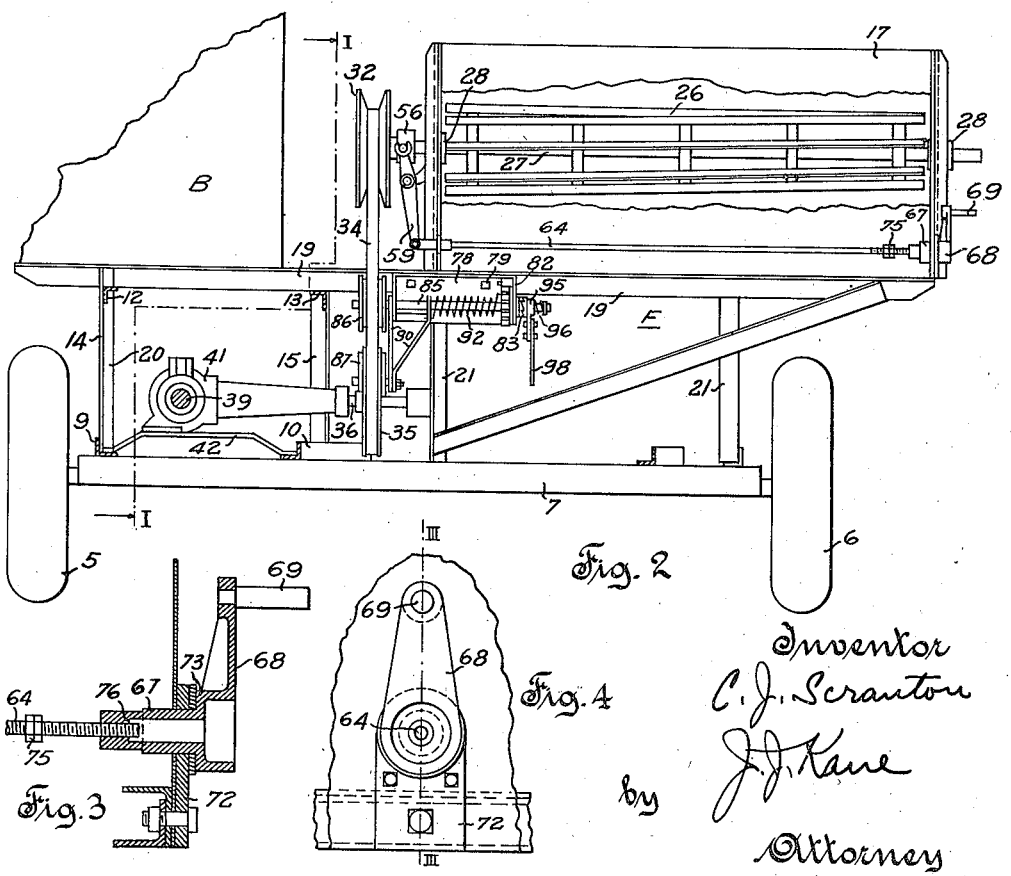

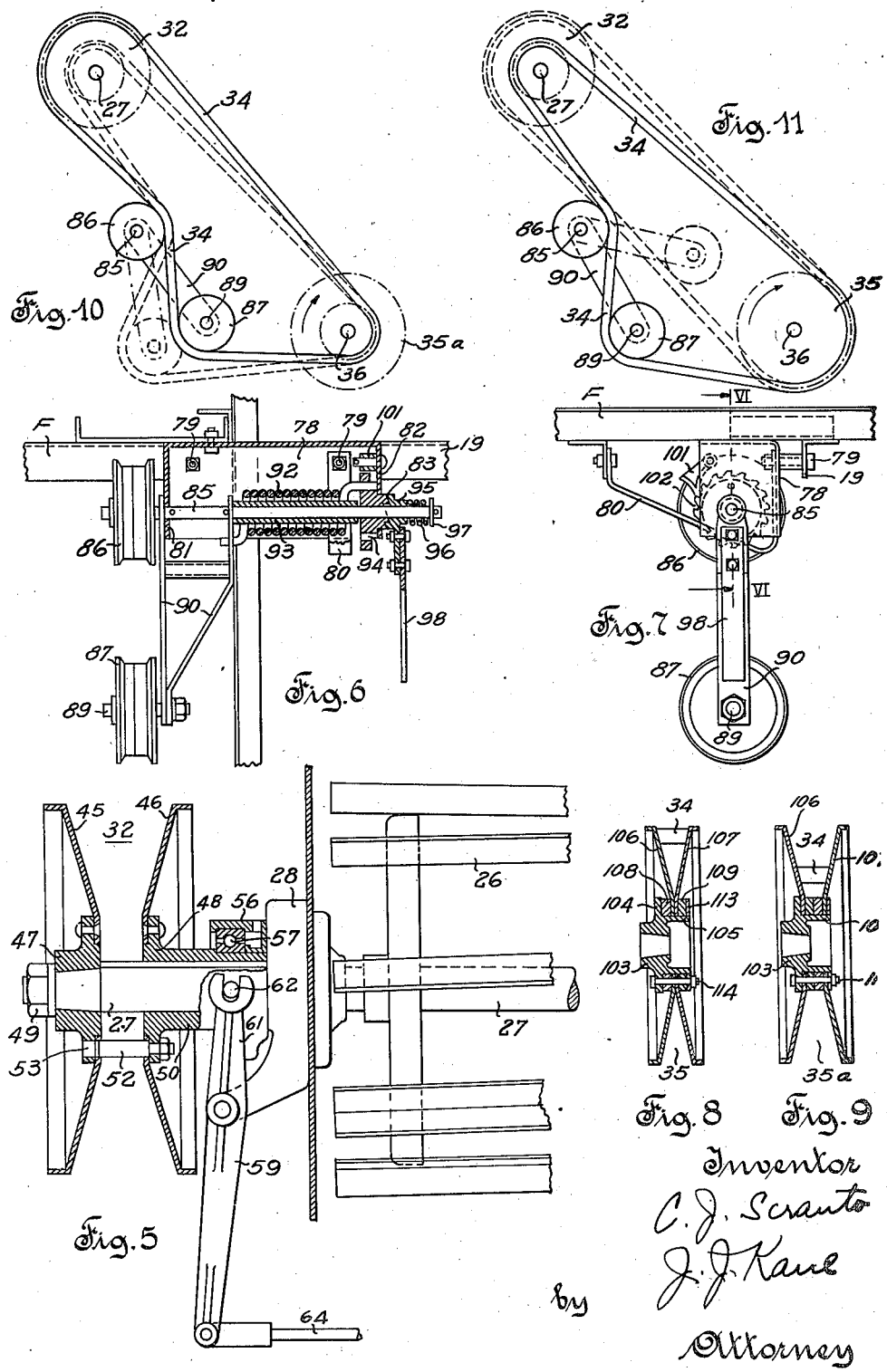

Patented Jan. 27, 1948

2,435,020

UNITED STATES PATENT OFFICE 2,435,020

THRESHER WITH ADJUSTABLE SPEED CYLINDER DRIVE

Charles J. Scranton, La Porte, Ind., assignor to Allis-Chalmers Manufacturing Company, Milwaukee, Wis., a corporation of Delaware Application May 8, 1941, Serial No. 392,469

2 Claims. (Cl. 130—27)

This invention relates in general to the operation of threshing and like machines under variable speed conditions; and the invention is particularly concerned with the provision of a threshing machine of the harvester-thresher type equipped with a variable speed threshing cylinder drive affording a wide variation in operating speeds of the cylinder.

In the operation of threshing machines, especially modern machines of the harvester-thresher type, it becomes desirable, in the interest of insuring efficient threshing operation, to operate the threshing cylinder at different speeds, depending upon the particular crop being harvested, and other conditions, such as moisture in or adhering to the material harvested and the volume of straw to be handled by the machine. And the most desirable operating speed of the threshing cylinder of a modern harvester-thresher, to effectively and efficiently take care of different crops and under different conditions thereof, might vary from approximately 425 R. P. M. to approximately 1700 R. P. M. And the present invention contemplates the provision of a threshing machine having a variable speed cylinder drive, of special utility in connection with a harvester-thresher, which provides in a simple manner for a very wide variation in the operating speed of the threshing cylinder and is readily adjustable, even with the machine in operation, to secure any desired cylinder speed. And the invention contemplates such an association of the drive and its adjusting means with the threshing machine as will permit adjustment of speed of the threshing cylinder from a position wherein adjustment by an operator involves little or no danger from moving parts of the machine.

It is an object of the present invention to provide an improved and efficient variable speed cylinder drive for a threshing machine, affording a wide range of operating speeds and readily adjustable during operation of the machine.

It is a further object of this invention to provide a threshing machine equipped with a variable speed threshing cylinder drive of improved design and construction and interrelation to the parts of the threshing machine.

It is a further object of this invention to provide a threshing machine of the harvester-thresher type equipped with a variable speed threshing cylinder drive of improved design and construction and interrelation to the parts of the machine, and providing for a wide variation in the operating speed of the threshing cylinder and adjustable by an operator, during operation of the machine, from a readily accessible position with minimum liability to injury through contact with moving parts of the machine.

These and other objects and advantages are attained by the present invention, various novel features of which will be apparent from the description and drawings, disclosing an embodiment of the invention, and will be more particularly pointed out in the annexed claims.

In the accompanying drawings:

Fig. 1 is a view in side elevation, with parts to the left of the vertical planes of the line I—I of Fig. 2 omitted, of a harvester-thresher of a conventional modern design and embodying features of the present invention;

Fig. 2 is a view in front elevation of the apparatus shown in Fig. 1, with the header platform and other parts omitted;

Figs. 3 and 4 are enlarged vertical sectional and side elevational views, respectively, of a detail concerned with the adjusting mechanism of the variable speed cylinder drive of the machine of Figs. 1 and 2, the plane of section of Fig. 3 being that of the line III—III of Fig. 4;

Figs. 5 and 6 are enlarged front elevations, with parts in section, of details of the cylinder drive, the plane of section of Fig. 6, being that of the line VI—VI of Fig. 7;

Fig. 7 is a side elevation of parts shown in Fig. 6;

Figs. 8 and 9 are vertical sectional views, in the plane of the line VIII—VIII of Fig. 1, showing the driving sheave in alternative conditions of operation; and Figs. 10 and 11 are diagrammatic views indicating two different operating conditions of the variable speed drive.

As indicated in Figs. 1 and 2 of the drawings, supporting wheels 5 and 6, mounted at the stubbleward and grainward sides, respectively, of a laterally extending axle 7, serve to support a harvester-thresher, the supporting frame structure F of the machine being mounted on the axle. This frame structure includes a forwardly extending draft frame portion 8, at the stubbleward side of the machine, the draft frame comprising a longitudinally extending frame bar 9 mounted on the axle near the end thereof and projecting rearwardly of the axle and forwardly thereof, and a second frame bar 10 mounted on the axle and extending rearwardly thereof and also extending forwardly in a general longitudinal direction, but inclined toward the frame bar 9 and connected thereto near the forward end thereof. Generally longitudinal frame bars 12 and 13, lying in the vertical planes of the frame bars 9 and 10, respectively, are inclined downwardly and united with the latter frame bars adjacent the forward end thereof. The rear ends of the frame bars 12 and 13 are secured to vertical supporting bars 14 and 15, respectively, mounted on the frame bars 9 and 10, respectively, forwardly of the axle 7.

A housing 17 is mounted on the frame structure F at the grainward side of the machine, the housing being supported in part by a horizontal frame bar 19 carried by vertical supports 21, with the front open end of the housing 17 projecting forwardly of the axle 7 and being laterally spaced from the draft frame 8. At the forward open end of the housing 17, a conventional header platform 23, through the side walls thereon, is pivotally mounted at its upper rear end with the side walls of the header projecting into the open forward end of the housing 17. The header platform is provided with a conveyer belt 24, preferably of conventional draper type, for carrying material, harvested by a sickle at the lower forward end of the platform, to the thresher housing. The axis of the upper roller, indicated at 25, of the feed draper 24 preferably coincides with the pivotal axis of the side walls of the header on the housing 17.

Within the thresher housing 17, at a point rearwardly of the rear end of the conveying draper 24, is mounted a threshing cylinder 26 having its shaft 27 rotatable in bearings 28 carried by the side walls of the housing 17. The threshing cylinder is preferably of heretofore known open bar type and cooperates with a stationary concave 30 mounted in the housing 17 beneath the cylinder, a forwardly projecting portion of the concave receiving material from the discharge end of the feed draper 24.

The stubbleward end of the cylinder shaft 27, beyond the housing 17, is provided with a V-groove sheave 32 of adjustable type, to be described more in detail hereinafter. And a V-belt 34 passing about a driving sheave 35, described more in detail hereinafter, on the shaft 36 serves to drive the cylinder shaft 27 at a speed determined by the speed of the shaft 36 and the relation between the pitch diameters of sheaves 32 and 35.

Power is supplied to the driving shaft 36 from a longitudinal drive shaft 39 having flexibly connected portions and suitably supported at its rear end in a bearing provided in a transmission housing 41 carried by a platform 42 mounted on the lower longitudinal frame bars 9 and 10 of the draft frame 8; and the front end of the drive shaft 39 is supported in conventional manner in a suitable bearing carried by and adjacent the forward end of the draft frame, the forward end of this drive shaft being provided with conventional means for connection to a power takeoff on the tractor engine. A suitable gear connection, referred to hereinafter, between the rear end of the drive shaft 39 and the stubbleward end of the shaft 36 is provided within the transmission housing 41 for driving the shaft 36 from the drive shaft 39.

When the harvester-thresher is drawn through a field by a tractor, with the latter operating the drive shaft 39 carried by the draft frame, the various conventional operating mechanisms of the harvester-thresher, such as the harvesting sickle, the threshing cylinder, the separating and cleaning mechanism and the necessary elevators, are operated from the drive shaft 39. During such operation of the apparatus, grain or other crop is cut by the sickle at the forward end of the header platform 23, and the cut grain is deposited on the feeding draper 24 and conveyed by the latter to its upper rear end, whence it is discharged toward the threshing cylinder 26. And the cylinder, rotating at a normal speed, draws and forces the harvested stalks between the cylinder and the concave 30, threshing the grain or seed from the stalks; and the straw or stalks and threshed grain are forced out rearwardly and upwardly from the space between the cylinder and the concave into the separating mechanism disposed to the rear of the cylinder. After suitable separating action thereon, the straw is discharged from the apparatus, and the grain recovered through the separating action, is conveyed, preferably after a further conventional cleaning action, and discharged to a receiving bin B suitably mounted on the supporting frame structure F.

What might be a satisfactory and efficient operating speed of the threshing cylinder when threshing thoroughly dry grain or the like, as when operating a harvester-thresher during the middle of a bright day, would not be satisfactory or efficient when threshing grain or the like under somewhat damp or other conditions; and to accommodate for such variable conditions, a simple and readily operated device is provided, through which the speed of the threshing cylinder can be readily adjusted over a wide range with full safety to the operator during the necessary adjustments.

It is common in modern tractor-drawn harvester-threshers to concentrate as much of the main drive elements, including the sheaves, similar to the sheaves 32 and 35 between the grainward side of the thresher housing and an offset draft frame, such as indicated at 8. This is a position which is not readily accessible to an operator without climbing or leaning on or over the draft frame; and it is a position wherein the operator is very likely to be injured when the tractor engine is driving the operating mechanisms of the harvester-thresher, even though the tractor and harvester-thresher are stationary at the time. And since it is very desirable for an operator to be able to accurately determine the speed of the threshing cylinder while he is making adjustments of such speed, it becomes highly desirable that the speed of the threshing cylinder be capable of being readily varied from a point where the operator can be safe, even though the threshing cylinder and other parts of the machine are in operation; and it is likewise highly desirable that the operator, in such a safe position, be able to make tachometer readings of the cylinder speed at the same time he is changing such speed. These effects are accomplished through provisions hereinafter described.

Sheave 32 on the cylinder shaft 27 is composed of two outwardly flaring side walls 45 and 46 having hub portions 47 and 48, respectively, integral with or attached thereto; and the side wall 45 is held fixed relative to the shaft 27 by having its hub portion forced and held by a nut 49 on a tapered end of the shaft. And the hub portion 48 of the side wall 46 is provided with a sleeve portion 50 extending inwardly toward the wall of the housing 17; this hub portion 48, with its sleeve 50, being splined on the shaft 27 so as to provide for rotation of the side wall 46 with the shaft while permitting axial movement toward and from the side wall 45, to vary the effective pitch diameter of the sheave. Insurance against relative rotation between the side walls 45 and 46 of the sheave is provided through a plurality of spaced axially extending pins or bolts 52 secured to the hub 48 and passing, with a guiding fit, into corresponding spaced apertures 53 in the hub portion 47 of the side wall 45.

The side wall 46 may be adjusted to desired position with respect to the side wall 45 to provide a V-groove sheave of desired effective pitch diameter for the V driving belt 34, by means of an adjusting collar 56 mounted upon the sleeve 50 of the hub portion of the side wall 46 in such a manner as permits rotation of the sleeve portion within the collar and also permits axial movement of the sleeve portion along with the collar. A suitable arrangement is one wherein a ball bearing 57 is provided between the sleeve portion 50 and the collar 56, the inner race of this ball bearing being held in fixed position on the sleeve and the outer race being held in fixed position within the collar. An actuating lever 59, pivoted intermediate its ends to a fixed portion of the apparatus, such as a projection on the outer portion of the adjacent bearing 28 of the cylinder shaft, has its upper end of conventional clevis formation with the arms, indicated at 61, embracing opposite sides of the collar, the upper end of each such arm being slotted to receive a pin 62 projecting from the side of the collar 56.

The sheave adjusting lever 59 is operated by an actuating rod 64 having its stubbleward end pivotally secured to the depending lower portion of the lever 59. This actuating rod passes through an aperture in the adjacent portion of the stubbleward side wall of the housing 17 and extends laterally through the housing, beneath the concave 30, defining the lower wall of the active threshing chamber. The opposite end of the rod 64 is in threaded engagement with interior threads formed within a hollow stud portion 67 of an actuating element 68 having an actuating crank 69. This actuating element is held in operative position, with the hollow stud portion thereof passing through and rotatably mounted in an aperture in the grainward side wall of the housing 17, with a guiding fit in a bearing element, in the form of an apertured plate 72 removably mounted on the outer side wall of the housing 17. The outer head portion of the actuating element is provided with an external flange providing an abutment shoulder 73 bearing directly, or through the intermediate of a washer, against the outer face of the bearing plate 72.

The spreading action of the belt 34 in the groove of the sheave 32 against the side wall 46 thereof may be relied on to hold the actuating element drawn into firm frictional engagement against the outer face of the bearing plate 72; or the bearing plate may be formed in separate upper and lower sections entering an annular groove in the periphery of the stud portion 67 to thereby positively hold the actuating element against axial movement relative to the side wall of the housing, while permitting rotation of the actuating element. A nut 75, locked in predetermined position on the rod 64, serves, through engagement with the inner end of the stud portion 67 of the actuating element, to limit the degree to which the side wall 46 of the sheave 32 may be forced toward the side wall 45 thereof. If it should be desired to limit the separation of the side wall 46 of the sheave from the side wall 45 thereof to a degree less than that provided by engagement of the sleeve portion 50 of the side wall 46 and the collar 56 with the adjacent face of the stubbleward bearing 28, a lock nut similar to that indicated at 75, may be provided on the outer end of the rod 56 for engagement with an internal abutment shoulder 76 on the hollow stud portion 67 of the actuating element. While the crowding action of the belt 34 against the side wall 46 of the sheave 32 may be sufficient to frictionally hold the actuating element in adjusted position, this effect may be supplemented with a conventional form of latching device associated with the actuating element and the bearing plate 72.

A supporting bracket 78 is secured in position on the supporting structure of the harvester-thresher, below the forwardly projecting end of the housing 17, this bracket being mounted in position through hanging bolts 79 alone, secured to the frame bar 19, or in conjunction with one or more supplemental bracing brackets 80, whose rear end is secured through a bolt 79 and whose forward end is suitably secured to a portion of the frame structure. The supporting bracket 78 is provided with side walls 81, 82 having alined apertures, the aperture in the side wall 82 being considerably larger than the aperture in the side wall 81. Within the aperture in the side wall 82, an element 83 is mounted for guided rotation through the wall of the aperture, this element being centrally apertured and having a peripheral flange at its inner end and a ratchet surface at its opposite end projecting beyond the side wall of the bracket.

A rod or shaft 85 passes through the aperture in the side wall 81 and through the aperture in the ratchet element 83, this shaft being supported in position by and extending laterally beyond the supporting parts, and being suitably held against appreciable axial movement. An idler pulley 86 is rotatably mounted upon the end of the shaft 85 extending beyond the side wall 81 of the supporting bracket. A second idler pulley 87 is rotatably mounted on a stud shaft or bolt 89 extending laterally from the lower end of a supporting hanger or bracket 90 whose upper end is rotatably hung on the shaft 85 in such a manner that the hanger may swing or oscillate on the shaft 85. The pulleys 86 and 87 are disposed in a vertical plane which substantially coincides with the plane of the pulleys 32 and 35.

As indicated in Figs. 10 and 11, the idler pulley 86 bears on the outer surface of the belt 34 under all conditions of variable adjustment of the drive, and the idler 87 may be caused to bear on the inner surface of the belt with such varying degree of pressure as to cause the lower course of the belt to assume the necessary distortion to assure firm driving contact with the walls of the adjustable sheave 32 in its various conditions of adjustment. A torsion spring 92 surrounds that portion of the shaft 85 between the bracket 90 and the ratchet member 83, being spaced from the shaft by a separating sleeve 93. One end of the spring 92 is secured to the bracket 90 and the other end of the spring is secured to the ratchet element 83, this connection preferably being made by inserting the extending end of the spring into a selected one of a plurality of apertures 94 in the flange portion of the ratchet element.

A ratchet operating head 95 surrounds the grainward end of the shaft 85 and is provided with ratchet teeth for coaction with the ratchet teeth of the element 83, the teeth on the rachet head 95 being biased into engagement with the teeth on the ratchet element 83 by a compression spring 96 surrounding the shaft and bearing against the ratchet head and a collar 97 secured to the shaft. The ratchet head is provided with an operating handle 98, through which it may be actuated to rotate the ratchet element 83, through the ratchet connection between these parts, so as to apply the required torsional strain on the spring 92 to cause it to urge the hanger 90 to a position wherein the idler 87 serves to place the required tension on the driving belt 34. During adjustment of the torsional strain on the spring 92, a holding latch 101, pivotally mounted on the end wall 82 of the supporting bracket, may be released from holding engagement with a cooperative series of notches 102 on the periphery of the flanged portion of the ratchet element 83. The torsion of the spring 92 may be adjusted initially through the ratchet device, so as to cause the idler 87 to bear with the required degree of pressure on the inner surface of the belt 34, to thereby produce a satisfactory degree of tension thereon for efficient driving of the adjustable sheave 32 throughout its full range of adjustment or pitch diameter.

As indicated in Fig. 8, the pulley 35 is made up of a centrally apertured hub 103 through which the sheave is secured on the shaft 36, the hub being provided with a peripheral flange 104 from which a longitudinally extending circular flange 105 projects. The side walls 106 and 107 of the sheave, inclined away from each other toward the periphery, are secured in position on the flange 104 through the intermediary of a spacer ring 108 disposed between the flange 105 on the hub and the inner portion of the side wall 106, and a spacer ring 109 between the radially inner portion of the side wall 107 and an annular clamping plate 113. Clamping bolts 114, passing through alined apertures in the side walls 106, 107, the spacer rings 108, 109 and the clamping plate 113, serve to hold the parts in assembled relation. This relative arrangement of the side walls of the sheave and the spacer rings 108, 109, shown in Fig. 8, will produce a sheave of an effective pitch diameter for operation of the belt 34 that is only slightly less than the full diameter of the side walls of the sheave.

Where it is desired that the sheave have a considerably smaller effective pitch diameter for operation of the belt 34, the sheave may be assembled with the spacer rings 108, 109 disposed between the radially inner portions of the side walls 106, 107, and the parts clamped together by the bolts 114 passing through the apertures in the side walls, the spacer rings and the clamping plate 113, a sheave thus assembled being designated as 35a in Fig. 9.

With the sheave 35 assembled as indicated in Fig. 8, and the torsional strain of the spring 92 suitably adjusted, through the ratchet head 95, to yieldingly force the hanger 90 downwardly to cause the idler pulley 87 to bear in forcible, but yielding, manner on the inner surface of the driving belt 34 and distort the belt to any position between that shown in dotted lines and that shown in full lines in Fig. 11, the drive, assuming that the shaft 36 is driven at a speed of 850 R. P. M., is capable of causing the cylinder shaft to be operated at any speed between a maximum of approximately 1700 R. P. M. and a minimum of approximately 850 R. P. M., by merely adjusting the side wall 46 of the sheave 32, through suitable operation of the actuating crank 69 at the grainward side of the housing 17, to produce an effective pitch diameter for the sheave 32 corresponding to the desired cylinder speed. In Fig. 11, parts of the drive are shown in full lines in the positions assumed when the cylinder shaft is driven at its highest speed, and the parts as shown in dotted lines in the positions assumed when the cylinder shaft is driven at its lowest speed.

When it is desired to thresh material, or under conditions, requiring an efficient cylinder speed less than 850 R. P. M., the lowest speed assumed to be attainable through the use of the sheave 35, when assembled as shown in Fig. 8, and with the shaft 36 operating at 850 R. P. M., this sheave is dissembled and reassembled in the form shown in Fig. 9, thus affording an effective pitch diameter, when using the same belt 34, equal to approximately one-half of the effective pitch diameter of the sheave 35 when assembled, as shown in Fig. 8.

With the sheave 35a in use, it may be desirable to increase the torsional strain on the spring 92, so as to increase the effective range of operative positions of the idler pulley 87. Any necessary adjustment can be made through the ratchet adjusting handle 98, on release of the latch 101. Then, with the sheave 35a driven by the shaft 36, operating at its normal assumed speed of 850 R. P. M., the speed of the cylinder shaft may be varied from a maximum of approximately 850 R. P. M., attained when the parts are in the dotted line position indicated in Fig. 10, to a minimum speed of approximately 425 R. P. M., attained when the parts are in full line position indicated in Fig. 10, such adjustment of the cylinder speed being accomplished by increasing the pitch diameter of the sheave 32 through suitable adjustment of the actuating crank 69 at the grainward side of the housing 17.

It will be apparent that through the invention disclosed hereinabove, there is provided a very simple and economical and rugged variable speed drive capable of readily varying the speed of the threshing cylinder over a wide range to suitably accommodate for widely varying threshing conditions, and that the operator can readily make any such changes in speed from a position at the grainward side of the cylinder shaft and the machine, where he is safe from injury from moving parts of the machine and can readily determine the cylinder speed during such speed adjustment.

It should be understood that features of the invention disclosed herein have definite utility in other than the particular apparatus described, and that the invention is not limited to the exact details of construction shown and described, for obvious modifications within the scope of the annexed claims will be apparent to persons skilled in the art.

It is claimed and desired to secure by Letters Patent:

1. In a harvester-thresher of the type including a wheeled supporting frame structure having a forwardly extending draft element at the stubbleward side of the machine and supporting a power shaft for driving operating mechanisms of the machine and having a thresher housing mounted on the frame structure at the grainward side of the machine and provided with a rotatable threshing cylinder having a shaft mounted in bearings supported by the side walls of said thresher housing, and a variable speed drive at the stubbleward side of the thresher housing from a shaft carried by said supporting structure and driven by said power shaft to the stubbleward end of said cylinder shaft, a device operable from the grainward side of the machine for adjusting said variable speed drive to vary the speed of said cylinder shaft, said adjusting device comprising a speed-adjusting actuating element at the stubbleward side of said thresher housing and cooperative with an adjustable element of said variable speed drive, a rotatable operating element mounted at the grainward side of said machine at a point adjacent the grainward end of said cylinder shaft where the operator may manipulate said operating element from a position adjacent said end of the cylinder shaft to adjust the speed of the cylinder shaft while measuring the speed thereof, an operating connection from said operating element to said speed-adjusting element to effect speed-varying actuation thereof, said operating connection comprising a reciprocable rod connected at one end in screw threaded relation to said operating element and operatively connected at the other end to said speed-adjusting element.

2. In a harvester-thresher of the type including a wheeled supporting frame having a forwardly extending draft frame at the stubbleward side of the machine and supporting a power shaft for driving operating mechanisms of the machine, and having a thresher housing mounted on the frame structure at the grainward side thereof, said thresher housing being provided with a threshing cylinder having a shaft rotatably mounted in the side walls of the housing, and a variable speed V-belt drive from a drive shaft driven by said power shaft to said cylinder shaft, said drive being located at the stubbleward side of the thresher housing and including a V-pulley on said drive shaft and a V-pulley on said cylinder shaft, one of said pulleys being of variable pitch diameter type, and a V-belt cooperative with said pulleys, a device operable from the grainward side of the machine for adjusting said variable speed drive to vary the speed of said cylinder shaft, said adjusting device comprising a speed-adjusting actuating element at the stubbleward side of the threshing element and cooperative with a portion of said variable pitch adjustable diameter sheave, an operating element mounted at the grainward side of said thresher housing at a point adjacent the grainward end of said cylinder shaft where the operator may manipulate said operating element to adjust the speed of the cylinder while measuring such speed on a tachometer held against the grainward end of said cylinder shaft during operation thereof, and an operating connection extending transversely across said thresher housing from said operating element to said adjustable actuating element to effect speed-varying actuation thereof during operation of said drive, and a belt tensioning device comprising a supporting bracket mounted in position beneath and extending beyond the stubbleward side of said thresher housing, a shaft mounted on said bracket, an arm pivotally mounted on said shaft, an idler pulley rotatably mounted on said arm at a point removed from the axis of said shaft and disposed in position to bear on the face of said belt to effect tensioning of the latter, a torsion spring surrounding said shaft with one end of the spring bearing against said pivoted arm, the other end of said spring being anchored to an element rotatably mounted upon an axis coincident with said shaft, and means for adjusting and releasably holding said anchorage element in position to provide the desired biasing effect of said spring on said pivoted arm to cause the latter to maintain desired tension on said belt over a wide range of speed variation of said drive.

CHARLES J. SCRANTON.

REFERENCES CITED

The following references are of record in the file of this patent:

UNITED STATES PATENTS

| Number | Name | Date |
| --- | --- | --- |
| 1,738,552 | Abbott | Dec. 10, 1929 |
| 1,715,595 | Gouldbourn | June 4, 1929 |
| 1,506,167 | Ellwood | Aug. 26, 1924 |
| 1,982,299 | Hapgood | Nov. 27, 1934 |
| 2,139,397 | Wigglesworth | Dec. 6, 1938 |
| 666,804 | Harvey | Jan. 29, 1901 |
| 724,480 | Kennedy | Apr. 7, 1908 |
| 2,314,250 | Welty | Mar. 16, 1943 |
| 403,048 | Jones | May 7, 1889 |

FOREIGN PATENTS

| Number | Country | Date |
| --- | --- | --- |
| 477,837 | Great Britain | Jan. 3, 1938 |

OTHER REFERENCES

New All Crop Harvester, Allis Chalmers Mfg. Co., copyright 1936, 1937, pages 12, 13, 18, 19, 26, 27, and 30.